United States Patent
Oyzerskiy (10) Patent No.: US 9,463,535 B2
(45) Date of Patent: Oct. 11, 2016

(54) CLIP ATTACHMENT SYSTEM CONNECTING AIRCRAFT STRUCTURES TO EACH OTHER

(71) Applicant: The Boeing Company, Chicago, IL (US)

(72) Inventor: Eduard Oyzerskiy, Sandy, UT (US)

(73) Assignee: THE BOEING COMPANY, Chicago, IL (US)

( * ) Notice: Subject to any disclaimer, the term of this patent is extended or adjusted under 35 U.S.C. 154(b) by 377 days.

(21) Appl. No.: 14/088,410

(22) Filed: Nov. 24, 2013

(65) Prior Publication Data

US 2014/0075738 A1 Mar. 20, 2014

Related U.S. Application Data

(62) Division of application No. 13/165,066, filed on Jun. 21, 2011, now Pat. No. 8,622,347.

(51) Int. Cl.
| | |
|---|---|
| *B64C 1/40* | (2006.01) |
| *B23P 11/00* | (2006.01) |
| *F16L 3/24* | (2006.01) |
| *H02G 3/32* | (2006.01) |

(52) U.S. Cl.
CPC ............ *B23P 11/00* (2013.01); *B64C 1/403* (2013.01); *B64C 1/406* (2013.01); *F16L 3/24* (2013.01); *H02G 3/32* (2013.01); *Y10T 29/49826* (2015.01); *Y10T 29/49947* (2015.01); *Y10T 403/74* (2015.01)

(58) Field of Classification Search
CPC .......... B64C 1/403; B64C 1/406; F16L 3/24; F16B 9/023
See application file for complete search history.

(56) References Cited

U.S. PATENT DOCUMENTS

| | | | |
|---|---|---|---|
| 2,211,728 A | 8/1940 | McFadden | |
| 5,680,680 A | 10/1997 | LaConte | |
| 7,059,565 B2 | 6/2006 | Scown et al. | |
| 7,210,657 B2 | 5/2007 | Plate et al. | |
| 7,735,780 B2 | 6/2010 | Coles | |
| 2004/0029462 A1* | 2/2004 | Herbkersman | B63H 21/30 440/111 |
| 2005/0082431 A1 | 4/2005 | Scown et al. | |
| 2006/0080933 A1* | 4/2006 | Robicheau | F16L 3/22 52/712 |
| 2012/0325968 A1 | 12/2012 | Oyzerskiy | |

FOREIGN PATENT DOCUMENTS

FR 2952418 A1 5/2011

* cited by examiner

*Primary Examiner* — Nicholas McFall

(74) *Attorney, Agent, or Firm* — Yee & Associates, P.C.

(57) ABSTRACT

In one advantageous embodiment of the present disclosure, an apparatus and method for supporting a load is provided. The apparatus comprises a structure having an inner surface with a shape configured to substantially conform to an outer surface of a stringer. A number of pins extends from the inner surface of the structure such that the number of pins are configured to engage holes in the outer surface of the stringer when the structure is placed over the outer surface of the stringer. The pins support the structure with respect to the stringer when a load is applied to the structure. A number of members extends from the outer surface of the structure such that the number of members is configured to connect to a part.

20 Claims, 10 Drawing Sheets

CLIP ATTACHMENT SYSTEM CONNECTING AIRCRAFT STRUCTURES TO EACH OTHER

This application is a divisional of U.S. patent application Ser. No. 13/165,066, filed Jun. 21, 2011.

BACKGROUND INFORMATION

1. Field

The present disclosure relates to attaching structures to each other and, more particularly, to attaching aircraft structures to each other. Still more particularly, the present disclosure relates to a method and apparatus for connecting parts to an aircraft stringer.

2. Background

Manufacturing and assembly of structures, such as those for aircraft, involves the assembly of different parts to form the structures. Different parts and/or structures are connected to each other in manufacturing the aircraft. Structures, such as reinforcing ribs, stringers, and/or other suitable structures may be used to support other parts and/or structures in the aircraft. For example, wiring bundles, hoses, cables, and other lines are examples of parts that may run through parts of an aircraft. These lines may be connected to structures, such as ribs and/or stringers in the aircraft. These structures may be used to provide support for system components, such as those described.

In connecting a line to a stringer, a fixture may be used to make the connection. For example, a fixture may be attached to a stringer for use in supporting system components. A fixture is attached to a stringer using blind fasteners. A blind fastener does not allow an operator to inspect the quality of the connection to the stringer.

Regulations may require that fasteners be sealed. The sealing may be performed to isolate the interior of the structure from other sections in the aircraft. This sealing may prevent liquids and/or vapors from exiting the structure from the location of the fasteners. These regulations may apply to different locations in the aircraft, such as a fuel tank or an electrical system in the aircraft.

A blind fastener is difficult to remove in these structures. As a result, repositioning of the fixture may be more difficult and time consuming than desired.

As a result, the manufacturing and assembly of the aircraft may take more time and expense than desired to obtain a desired positioning of parts near the stringer. Accordingly, it would be advantageous to have a method and apparatus that takes into account one or more of the issues discussed above, as well as possibly other issues.

SUMMARY

The present disclosure provides a method and apparatus for supporting a load from attached system components to a stringer of an aircraft. In one advantageous embodiment of the present disclosure, an apparatus for supporting a load is provided. The apparatus comprises a structure having an inner surface with a shape configured to substantially conform to an outer surface of a stringer. A number of pins extend from the inner surface of the structure such that the number of pins are configured to engage holes in the outer surface of the stringer when the structure is placed over the outer surface of the stringer. The number of pins supports the structure with respect to the stringer when a load is applied to the structure. A number of members extend from the outer surface of the structure such that the number of members is configured to connect to a part.

In another advantageous embodiment, an apparatus for connecting a load to a stringer in an aircraft includes a body having a first arm and a second arm, at least one pin affixed to the first arm and at least one pin affixed to the second arm, and a flange. The body also includes a center portion, with the first arm and the second arm being flexibly connected at the center portion. The first arm is configured to contact a first surface of the stringer, and the second arm is adapted to contact a second surface of the stringer. The body transitions between a flexed position and a locked position. The at least one pin of the first arm is configured to engage a hole positioned in the first surface of the stringer in the locked position and to disengage the hole in the flexed position. The at least one pin of the second arm is configured to engage a hole positioned in the second surface of the stringer in the locked position and to disengage the hole in the flexed position. The flange is configured to secure the first arm and the second arm in a locked position. The body receives the load when the first arm and the second arm are in the locked position.

In still a further advantageous embodiment, a method for supporting a part includes maintaining engagement of a clip with a stringer and supporting the part with a number of members. The clip comprises a structure having an inner surface with a shape configured to substantially conform to an outer surface of the stringer. The clip also comprises pins extending from the inner surface of the structure, wherein the pins are configured to engage holes in the outer surface of the stringer when the structure is placed over the outer surface of the stringer and supports the structure with respect to the stringer when a load is applied to the structure. The clip also includes the number of members, wherein the number of members is configured to be connected to the part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
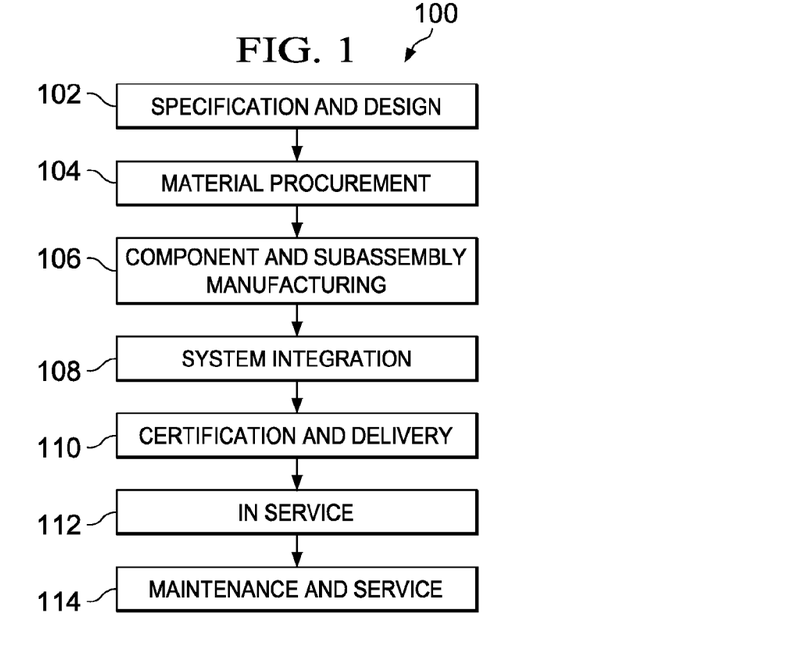
FIG. 1 is an illustration of a diagram illustrating an aircraft manufacturing and service method in which an advantageous embodiment may be implemented.
Figure 2:
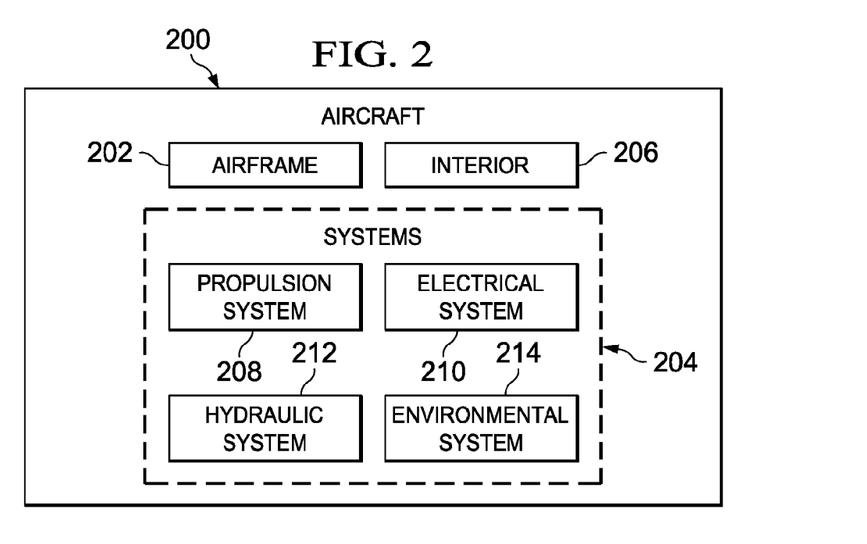
FIG. 2 is an illustration of a diagram of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may also be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

For example, one or more of the different advantageous embodiments may be used to connect a load or part to a structure during, for example, without limitation, component and subassembly manufacturing 106 and system integration 108.

The different advantageous embodiments recognize and take into account a number of different considerations. For example, the different advantageous embodiments recognize and take into account that blind fasteners, such as those used in suspending a part from an aircraft stringer, present undesirable features. Use of a blind fastener makes it difficult or impossible to visually inspect the fastener connection in an aircraft stringer.

The different advantageous embodiments recognize and take into account that lightning strike regulations may require that certain aircraft fasteners be sealed. For example, fasteners, such as those used in a fuel-related application may require sealing and/or isolation. In certain applications, it may be difficult or impossible to inspect and confirm that a fastener remains sealed and/or isolated after fastening.

The different advantageous embodiments also recognize and take into account that the use of blind fasteners in supporting a load from a structure presents difficulties in repositioning the fastener. After positioning a device, such as a part hanger with respect to a structure, it may later be desired to move the hanger. As further described herein, a hanger is a structure adapted for receiving a load or part. In an illustrative embodiment, a hanger may have features that allow for attachment of different kinds and sizes of parts. These features may include, for example, without limitation, holes and brackets. However, the use of a fastener can increase the time and labor needed to move the hanger.

Thus, the different advantageous embodiments provide a method and apparatus for supporting a load on an aircraft stringer. In an advantageous embodiment, an apparatus comprises a flexible polymer clip that is connected to the stringer in a manner that does not use metal fasteners or blind fasteners. Pins positioned on members of the clip secure the clip to the stringer by engaging holes formed in the stringer. The clip may be secured in the connected position. Flexing the clip allows it to be repositioned. A hanger positioned on the clip allows various parts to be connected to the clip and to the stringer.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

For example, the first component may be the clip and the second component may be the part to be connected to the clip. The hanger may be used in connecting the part to the clip.

Figure 3:
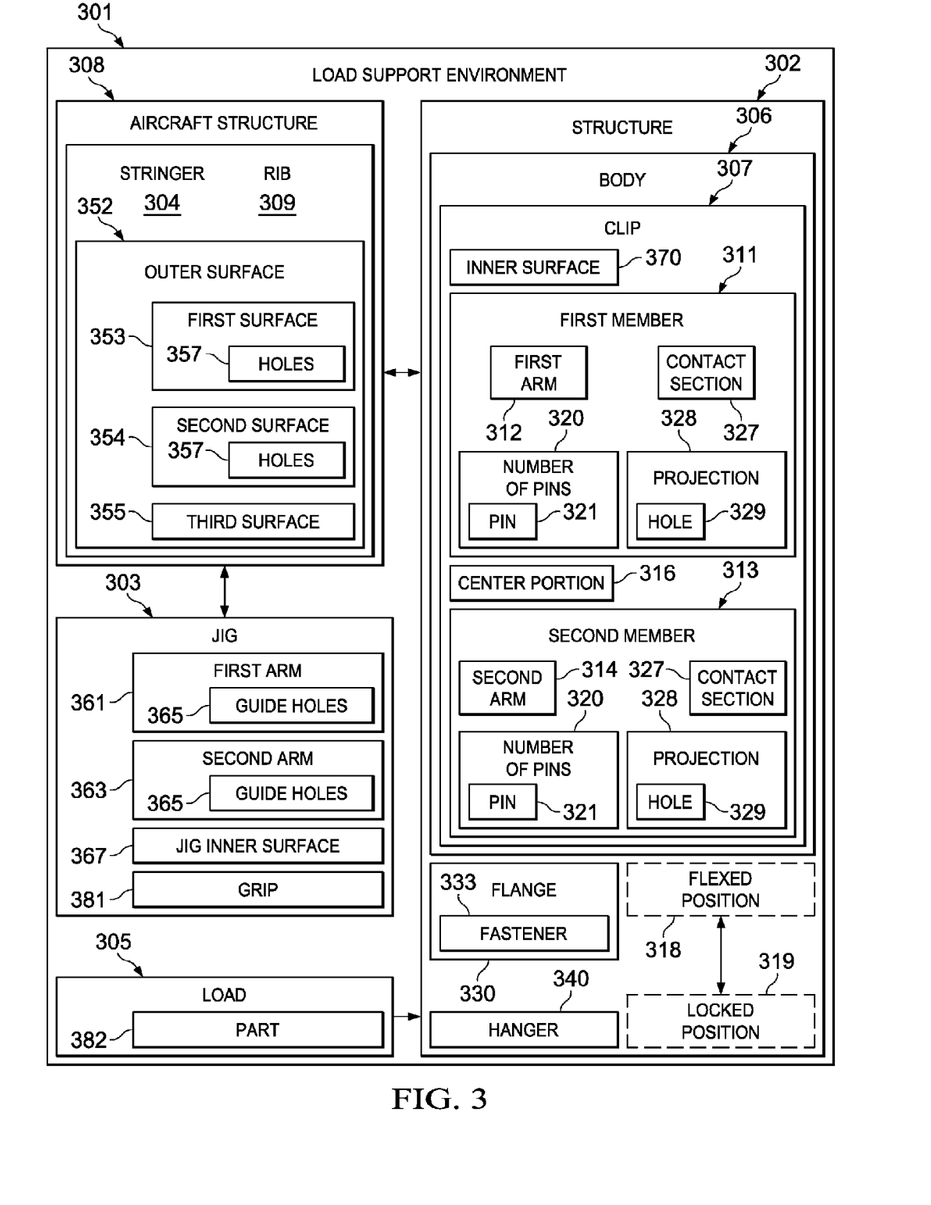
FIG. 3 is an illustration of a block diagram of a load support environment in accordance with an advantageous embodiment.

With reference now to FIG. 3, an illustration of a block diagram illustrating a load support environment is depicted in accordance with an advantageous embodiment. In this example, load support environment 301 includes structure 302 and jig 303 that may be used with aircraft structure 308. Aircraft structure 308 may be an aircraft part, assembly, or component, such as, for example, stringer 304 or rib 309. Jig 303, and as further described herein, provides a guide structure with guide holes 365 being useful in forming holes in aircraft structure 308.

In an advantageous embodiment, structure 302 is connected to stringer 304 so as to support load 305. Structure 302 may take the form of body 306. Additionally, structure 302 may take the form of clip 307. In an advantageous embodiment, structure 302 includes first member 311 and second member 313. First member 311 and second member 313 may take the form of first arm 312 and second arm 314. Additionally, first member 311 and second member 313 may be connected to each other by center portion 316. Optionally, first member 311 and second member 313 are separate pieces, and center portion 316 is not present.

Center portion 316 may comprise a flexible connection such that structure 302 flexes. The flexing may allow first member 311 to move with respect to second member 313.

Structure 302 may flex to move between flexed position 318 and locked position 319. Structure 302 also has inner surface 370.

First member 311 and second member 313 may each comprise contact section 327 and projection 328. Contact section 327 is shaped and configured to contact aircraft structure 308 when structure 302 is engaged with aircraft structure 308 as described herein. Contact section 327 may include curves so that contact section 327 makes substantial contact with a curved surface on aircraft structure 308. Projection 328 may be configured to extend from contact section 327 in a substantially normal orientation. Projection 328 may be provided with holes 329 for attaching to flange 330 as further described herein.

Structure 302 may further include number of pins 320. In one illustrative example, number of pins 320 are unitary and formed with structure 302. Alternatively, number of pins 320 may be separate pieces attached to structure 302. Pin 321 in number of pins 320 may be disposed on first member 311. Further, pin 321 in number of pins 320 may be disposed on second member 313. In one advantageous embodiment, pin 321 comprises a protrusion that extends from first member 311 or second member 313. Number of pins 320 may extend from contact section 327 of structure 302.

Structure 302 may further include flange 330. In one advantageous embodiment, flange 330 is disposed so as to connect to first member 311 and second member 313. Flange 330 may connect first member 311 and second member 313 in a spatial relationship that comprises a locked position 319. Flange 330 may be a generally rigid piece which prevents movement of first member 311 and second member 313.

When flange 330 is not connected to both first member 311 and second member 313, structure 302 may flex. However, when flange 330 is connected to both first member 311 and second member 313, structure 302 cannot flex. As used herein, "flex", "flexing", and the like, means that structure 302 can bend or move. Flexing may comprise movement of center portion 316 such that the positions of first member 311 and second member 313, relative to each other, can change. In other words, first member 311 may be moved closer to second member 313 by the flexing of structure 302.

In these illustrative examples, flange 330 may be connected to first member 311 and second member 313 using fastener 333. A number of different fasteners in fastener 333 may be used, such as, for example, rivets, screws, and bolts. Fastener 333 may engage with holes 329 of projection 328 on first member 311 and projection 328 on second member 313.

In one illustrative example, hanger 340 is connected to flange 330. In another advantageous embodiment, hanger 340 is a unitary piece with flange 330. Also, hanger 340 may be connected to structure 302. In one advantageous embodiment, hanger 340 is configured to connect part 382 to hanger 340. Part 382 includes load 305. In this manner, structure 302 may provide support for load 305. Hanger 340 may comprise a generally rigid piece adapted for receiving other components or parts. For example, other aircraft parts, such as tubes, conduits, wiring, and wire assemblies may be attached to hanger 340.

Structure 302 may comprise a unitary piece or, alternatively, may comprise separate pieces. Structure 302 may be comprised of one or more different materials. These materials may be selected from one of a plastic, a metal, a metal alloy, a thermoplastic, and any combinations thereof. In one advantageous embodiment, structure 302 comprises a polymer material formed by injection molding.

In an illustrative example, structure 302 is configured to attach to aircraft structure 308. In one illustrative example, aircraft structure 308 comprises stringer 304. Stringer 304 may comprise part of aircraft 200 as depicted in FIG. 2, including a part of airframe 202. Stringer 304 may include outer surface 352 including first surface 353, second surface 354, and third surface 355. Holes 357 may be formed in first surface 353 and second surface 354. Structure 302 may attach to aircraft structure 308 and, as further described herein, structure 302 may be removed from aircraft structure 308 and/or repositioned on aircraft structure 308.

Structure 302 and stringer 304 are mutually configured so that they may engage. As used herein, the term "engaged", "engage", "engaging", and the like means that when engaged, inner surface 370 of structure 302 substantially conforms to outer surface 352 of stringer 304. Inner surface 370 may be in full or partial contact with outer surface 352. Further, when engaged, structure 302 and stringer 304 are configured such that forces from load 305 are transferred through structure 302 to stringer 304.

Additionally, pin 321 disposed on first member 311 is configured to engage holes 357 in first surface 353, and pin 321 in second member 313 is configured to engage holes 357 in second surface 354. As used herein, when a pin engages with a hole, the term "engages" also means that the pin enters the hole. The engagement of pin 321 in holes 357 further acts to transfer load 305 through structure 302 to stringer 304. Stringer 304 may also include third surface 355. Third surface 355 may substantially engage with inner surface 370 of structure 302, but in other embodiments, third surface 355 does not engage with inner surface 370.

Load support environment 301 may also include jig 303. Jig 303 may comprise first arm 361 and second arm 363. Guide holes 365 may be formed in first arm 361 and second arm 363. Jig 303 is configured such that a jig inner surface 367 closely engages with outer surface 352 of stringer 304. When jig 303 is closely engaged with stringer 304, guide holes 365 are positioned relative to first surface 353 and second surface 354 of stringer 304 such that guide holes 365 are aligned where it is desired to form holes 357 in first surface 353 and second surface 354. Holes 357 may thus be formed in first surface 353 and second surface 354 by a forming operation, such as, for example drilling, using guide holes 365 as a guide or template for the forming operation. Jig 303 may also include grip 381 which an operator may grasp for manually manipulating jig 303.

Part 382, which may be suspended from hanger 340, may comprise any number of articles in aircraft 200 in FIG. 2. For example, without limitation, part 382 may be a conduit, a pipe, a tube, a panel, a wiring bundle, or some other suitable part.

The illustration of load support environment 301 in FIG. 3 is not meant to imply physical or architectural limitations to the manner in which an advantageous embodiment may be implemented. Other components in addition to, and/or in place of, the ones illustrated may be used. Some components may be unnecessary. Also, the blocks are presented to illustrate some functional components. One or more of these blocks may be combined and/or divided into different blocks when implemented in an advantageous embodiment.

In an advantageous embodiment, structure 302 may be used with another structure 302 to support load 305. In such an example, a first structure may be attached to a first stringer and a second structure may be attached to a second stringer. In such case, structure 302 includes first member 311 and second member 313 which are flexibly connected at center portion 316. Center portion 316 is configured to flex so as to transition between flexed position 318 and locked position 319.

In flexed position 318, structure 302 is configured such that first member 311 and second member 313 may pass over a corresponding surface, such as first surface 353 and second surface 354 of aircraft stringer 304. First member 311 and second member 313 may pass over stringer 304 without number of pins 320 disposed on each of first member 311 and second member 313, impeding the movement of structure 302.

Structure 302 may engage with stringer 304 until inner surface 370 of structure 302 contacts outer surface 352 of stringer 304. Contact may be made when center portion 316 contacts third surface 355 of stringer 304. Structure 302 may be transitioned to locked position 319 in which number of pins 320 engages with holes 357. Flange 330 may then be affixed to first member 311 and second member 313 so as to secure structure 302 in locked position 319.

Figure 4:
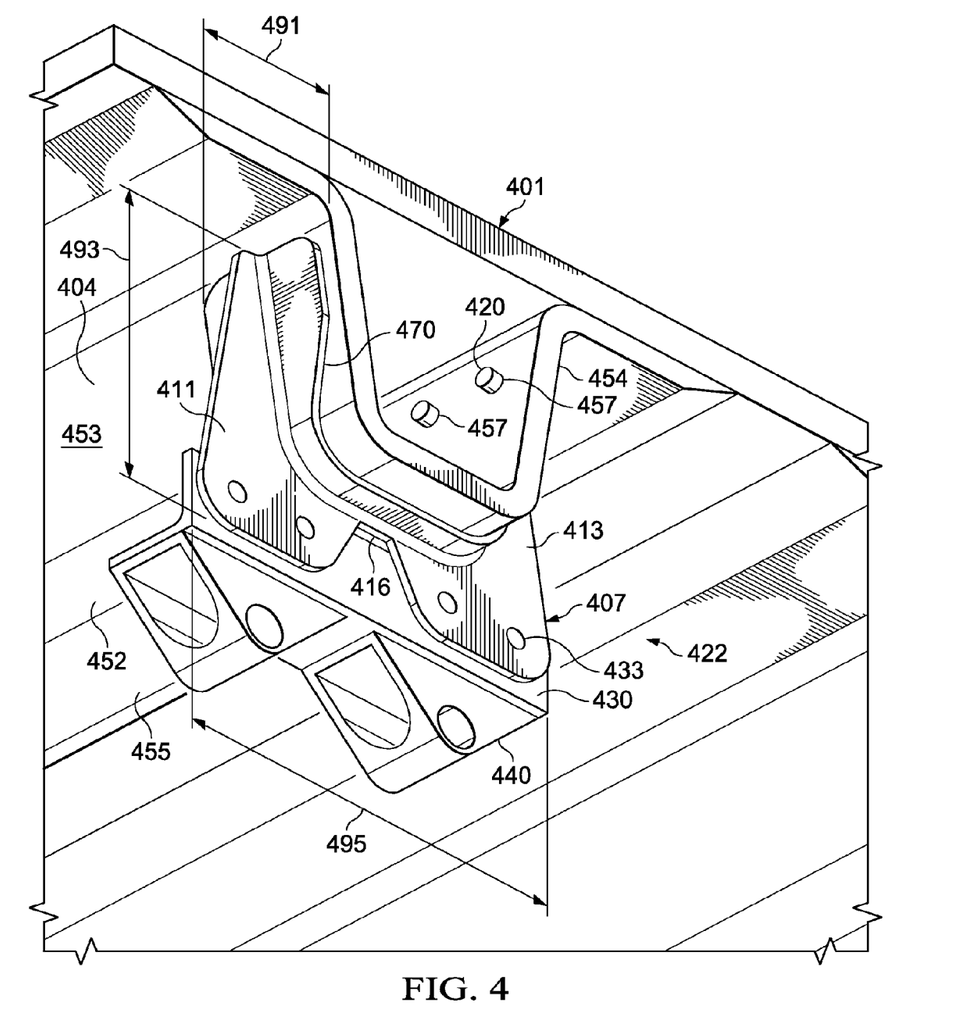
FIG. 4 is an illustration of a diagram of a clip in accordance with an advantageous embodiment.

With reference now to FIG. 4, an illustration of a diagram of clip 407 is depicted in accordance with an advantageous embodiment. In this example, clip 407 is an example of a physical implementation of structure 302 shown in block form in FIG. 3.

In this illustrative example, clip 407 is used in conjunction with stringer 404 of aircraft 401. Aircraft 401 is an example of one physical implementation of aircraft 200 in FIG. 2. Stringer 404 includes outer surface 452, as well as first surface 453, second surface 454, and third surface 455. Clip 407 includes inner surface 470. Inner surface 470 substantially engages with outer surface 452 of stringer 404. Flange 430 is connected to clip 407, and hanger 440 is connected to flange 430.

First member 411 of clip 407 is shown engaged with first surface 453 of stringer 404. Likewise, second member 413 of clip 407 is engaged with second surface 454. Number of pins 420 is engaged with holes 457. Clip 407 is depicted in locked position 422. First member 411 is held in relationship with respect to second member 413 by flange 430. Additionally, flange 430 is connected to each of first member 411 and second member 413 by fastener 433. Flange 430 prevents center portion 416 of clip 407 from flexing. When in locked position 422, clip 407 is positioned so that number of pins 420 is in place with respect to holes 457, and inner surface 470 of clip 407 is engaged with outer surface 452. Locked position 422 is an example of a physical implementation of locked position 319 in FIG. 3.

Referring still to FIG. 4, the physical dimensions of clip 407 may vary. In an advantageous embodiment, the dimensions of clip 407 are set so as to allow for the function of close engagement with stringer 404, as well as positioning within the space of aircraft 200 in FIG. 2.

A typical length is denoted by reference number 491 and may vary between about 1 inch to about 3 inches. A typical height is denoted by reference number 493 and may vary between about 2 inches to about 4 inches. A typical width is also denoted by reference number 495 and may vary between about 1.5 to about 4 inches.

With reference now to FIGS. 5-8, various illustrations of diagrams of a clip as illustrated in FIG. 4 are depicted in accordance with an advantageous embodiment. Therefore, FIGS. 5-8 share the same reference numerals as FIG. 4 and may correspond to the same components and have similar structures and functions.

Figure 5:
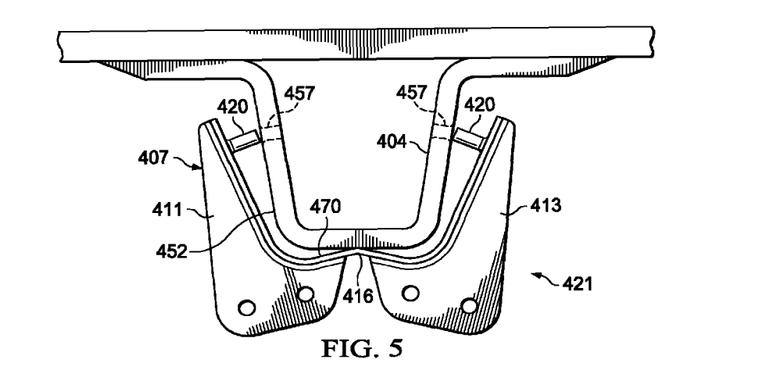
FIG. 5 is an illustration of a diagram of a clip in accordance with an advantageous embodiment.

Turning now to FIG. 5, an illustration of a clip in a flexed position is depicted in accordance with an advantageous embodiment. In this view, clip 407 is depicted in flexed position 421. Clip 407 has been flexed along center portion 416. In flexed position 421, the position of first member 411 relative to second member 413 has been changed. There is sufficient clearance so as to allow placement of clip 407 relative to stringer 404. Number of pins 420 is held with sufficient standoff from outer surface 452 so as to allow movement of clip 407 relative to stringer 404. Thus, in flexed position 421, clip 407 may be moved both laterally along the length of stringer 404, as well as toward or away from full engagement with stringer 404. In flexed position 421, clip 407 may be moved so as to allow an alignment of number of pins 420 with holes 457. Clip 407 may be moved into flexed position 421 by manual manipulation of an operator. One form of manual manipulation is the squeezing by hand of first member 411 together with second member 413. It is noted in FIG. 5 that flange 430 is not yet present on clip 407.

Figure 6:
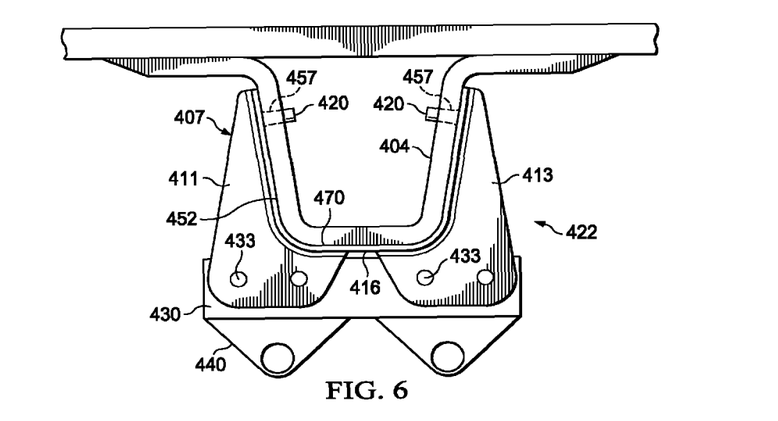
FIG. 6 is an illustration of a diagram of a clip in accordance with an advantageous embodiment.

With reference now to FIG. 6, an illustration of a diagram of a clip in a locked position is depicted in accordance with an advantageous embodiment. In this view, clip 407 is depicted in locked position 422.

As compared to the flexed position 421 in FIG. 5, an operator has manipulated clip 407 so as to transition clip 407 to locked position 422. In one advantageous embodiment, the operator releases hand squeezing of clip 407 which thereby allows clip 407 to flex back to locked position 422. In another embodiment, the operator manually moves first member 411 and second member 413 to locked position 422. Because number of pins 420 had been aligned with holes 457, when clip 407 is transitioned to locked position 422, number of pins 420 enter holes 457 and engages with holes 457. It is noted that inner surface 470 of clip 407 is in engagement with outer surface 452 of stringer 404. The contact of these surfaces provides load support through the transfer of mechanical forces there between.

FIG. 6 also depicts flange 430 affixed to first member 411 and second member 413 with fasteners 433. The placement of flange 430 serves to maintain clip 407 in locked position 422. First member 411 cannot move relative to second member 413 so as to flex clip 407 at center portion 416. Consequently, number of pins 420 remains positioned in holes 457. Thus, until flange 430 is removed, clip 407 remains connected to stringer 404. Hanger 440 has been affixed to flange 430.

Figure 7:
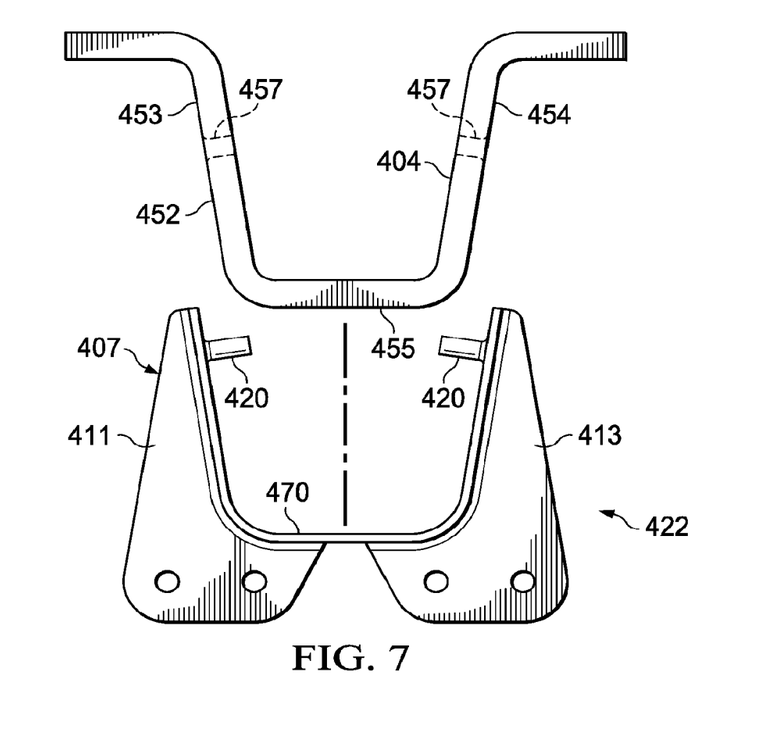
FIG. 7 is an illustration of an exploded view of a clip and stringer in accordance with an advantageous embodiment.

With reference now to FIG. 7, an illustration of an exploded view of a clip and stringer is depicted in accordance with an advantageous embodiment. In this view, clip 407 is depicted in an exploded view relative to stringer 404. Clip 407 is in locked position 422 and has not been transitioned to flexed position 421. FIG. 7 illustrates that outer surface 452 of stringer 404 closely matches inner surface 470 of clip 407. FIG. 7 also illustrates features of stringer 404 including first surface 453, second surface 454, and third surface 455.

Figure 8:
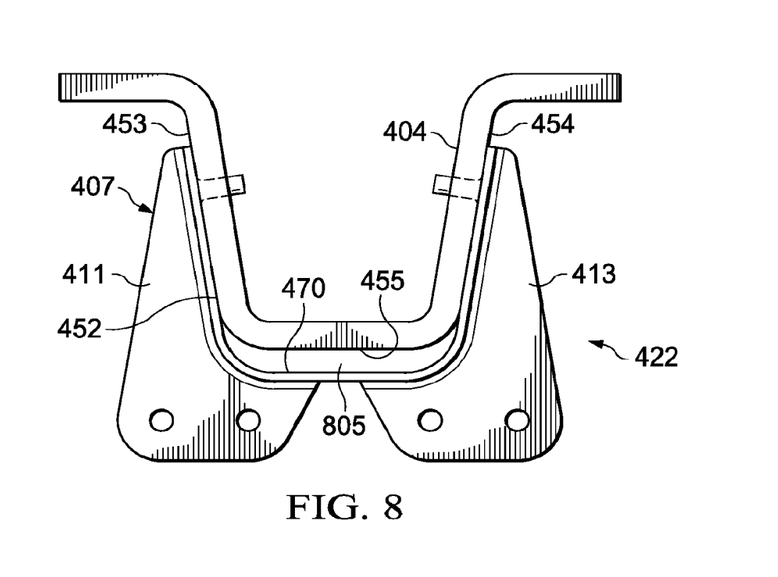
FIG. 8 is an illustration of a clip having a standoff from a stringer in accordance with an advantageous embodiment.

With reference now to FIG. 8, an illustration of a clip having a standoff from a stringer is depicted in accordance with an advantageous embodiment. In this view, clip 407 is depicted in locked position 422.

Clip 407 has been positioned so as to provide standoff 805 between inner surface 470 of clip 407 and third surface 455 of stringer 404. Standoff 805 is spacing between inner surface 470 and third surface 455. Standoff 805 may be desired so as to compensate the tolerance zone of the stringer web thickness. It is noted that inner surface 470 in first member 411 and second member 413 remains engaged with outer surface 452.

Figure 9:
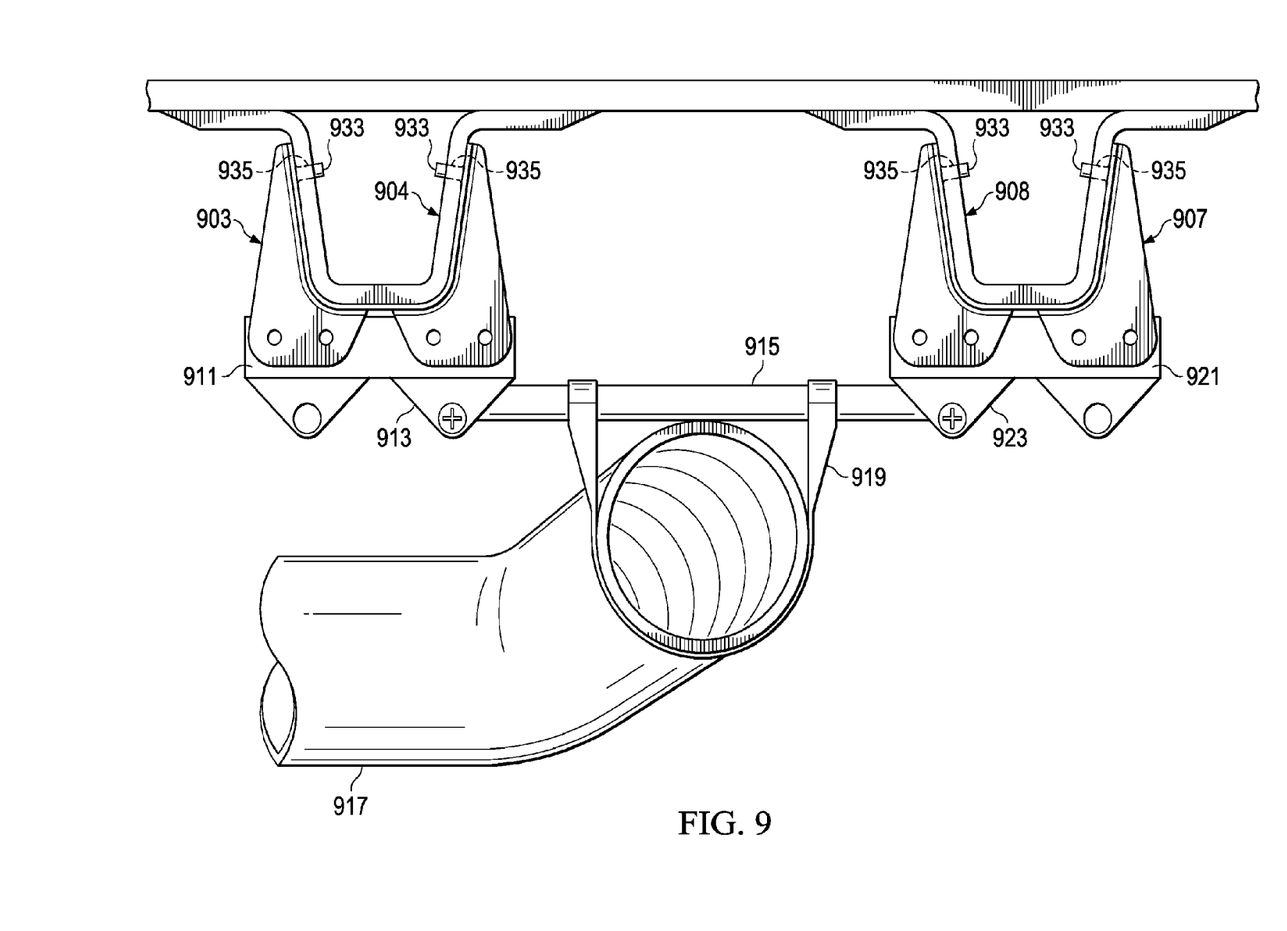
FIG. 9 is an illustration of a diagram of a support system in accordance with an advantageous embodiment.

With reference now to FIG. 9, an illustration of a support system is depicted in accordance with an advantageous embodiment. In this view, first clip 903 is connected to first stringer 904 and second clip 907 is affixed to second stringer 908. First clip 903 and second clip 907 are examples of clip 407 illustrated in FIG. 4.

First clip 903 includes first flange 911 and first hanger 913. Support 915 is affixed to first hanger 913. Second clip 907 includes second flange 921 and second hanger 923. Support 915 is also affixed to second hanger 923. Support 915 is generally positioned so as to span the space between first stringer 904 and second stringer 908.

Further, support 915 provides a positioning means for part 917. In the illustrative example, part 917 is a conduit that includes collar 919. Support 915 connects to collar 919 so as to maintain part 917 in a desired position relative to first stringer 904 and second stringer 908. First clip 903 and second clip 907 are each in locked position 319 as referenced in FIG. 3 with respect to first stringer 904 and second stringer 908.

Should an operator desire to remove or reposition part 917, the operator can easily do so. In order to remove part 917 it would be necessary to remove part 917 from support 915 and/or remove support 915 from first clip 903 and second clip 907. In order to move part 917, it may or may not be necessary to move first clip 903 and second clip 907. If it is necessary to move first clip 903 and second clip 907, it can be easily accomplished. An operator removes first flange 911 from first clip 903. First clip 903 is flexed and transitioned to flexed position 318 as illustrated in FIG. 3, thereby removing number of pins 933 from holes 935. First clip 903 may then be moved to a desired position. A similar operation would take place for second clip 907.

Figure 10:
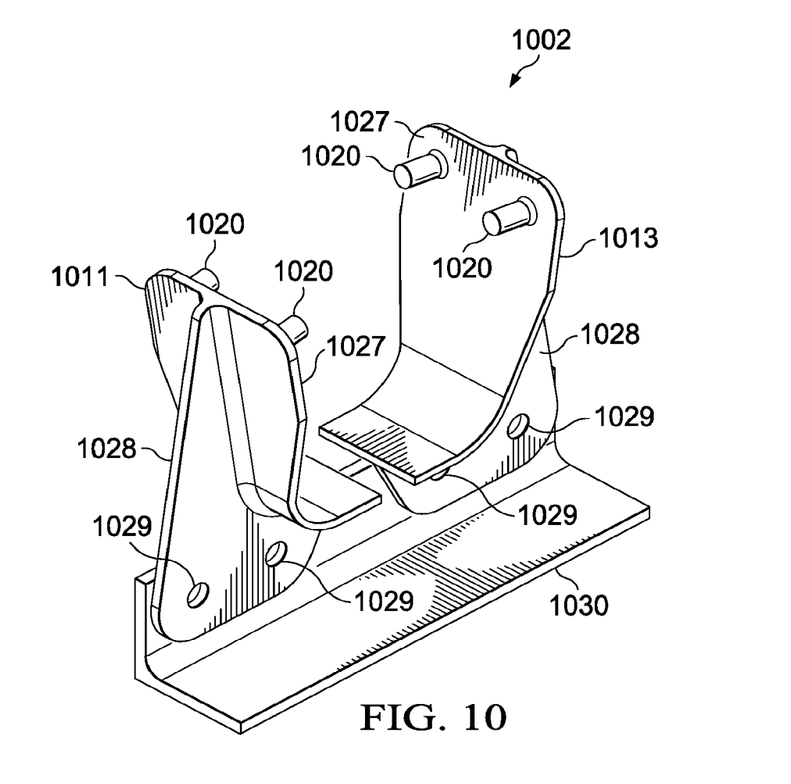
FIG. 10 is an illustration of a diagram of a clip in accordance with an advantageous embodiment.

With reference now to FIG. 10, an illustration of a diagram of a clip is depicted in accordance with an advantageous embodiment. In this example, structure 1002 is an example of a physical implementation of structure 302 shown in block form in FIG. 3. In this illustrative example, structure 1002 may be used in conjunction with a stringer, such as stringer 304 in FIG. 3.

Structure 1002 includes first member 1011 and second member 1013. First member 1011 and second member 1013 are separate structures. A flexible center portion 316 is not present. First member 1011 and second member 1013 may be independently moved and positioned with respect to one another. Flange 1030 is connected to first member 1011 and second member 1013 although fastener 333 has been removed for clarity. Holes 1029 of first member 1011 and second member 1013 are shown in alignment with corresponding holes on flange 1030.

First member 1011 also includes contact section 1027 and projection 1028. Second member 1013 also includes contact section 1027 and projection 1028. Contact section 1027 and projection 1028 on each of first member 1011 and second member 1013 are oriented in a substantially normal configuration. Projection 1028 on each of first member 1011 and second member 1013 are sufficiently aligned to allow flange 1030 to connect first member 1011 and second member 1013. Flange 1030 may comprise a substantially linear portion that connects first member 1011 and second member 1013. Projection 1028 may also be oriented substantially along a center of contact section 1027. Number of pins 1020 extends from contact section 1027 on each of first member 1011 and second member 1013. Number of pins 1020 may comprise two pins with a first pin positioned on one side of a center of contact section 1027 and a second pin positioned on the other side of the center of contact section 1027.

Figure 11:
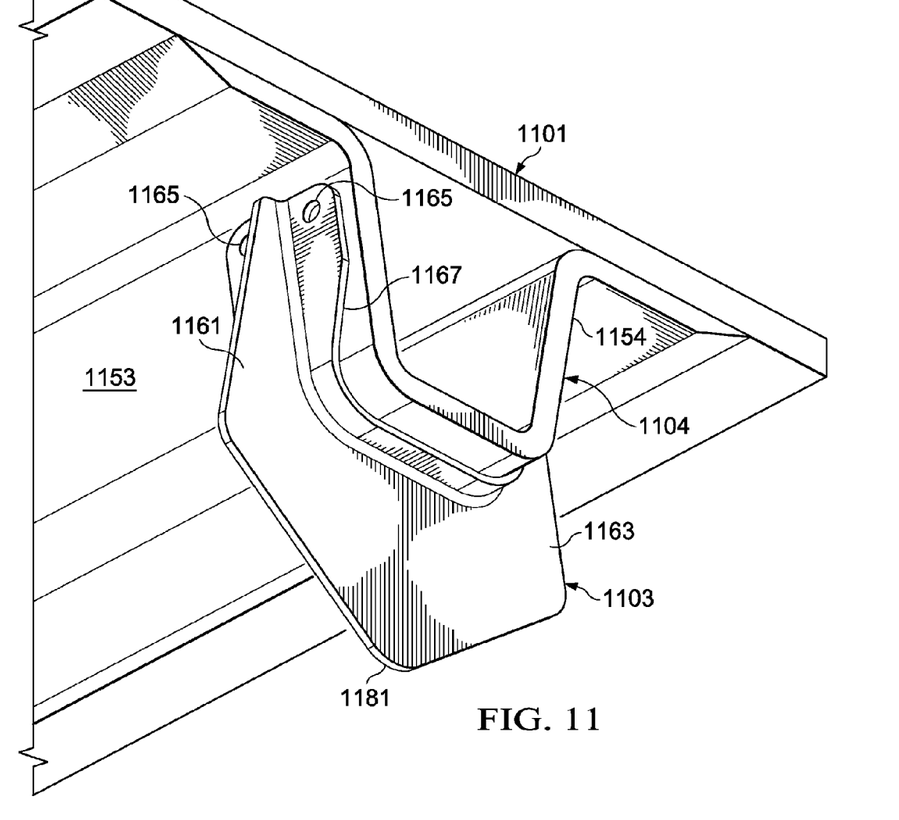
FIG. 11 is an illustration of a diagram of a jig in accordance with an advantageous embodiment.

With reference now to FIG. 11, an illustration of a diagram of a jig is depicted in accordance with an advantageous embodiment. In this example, jig 1103 is an example of a physical implementation of jig 303 shown in block form in FIG. 3. In this illustrative example, jig 1103 is used in conjunction with stringer 1104 of aircraft 1101. Aircraft 1101 is one example of a physical implementation of aircraft 200 in FIG. 2.

Jig 1103 includes first arm 1161 and second arm 1163. Guide holes 1165 are present in each of first arm 1161 and second arm 1163. Jig 1103 also includes jig inner surface 1167 that closely corresponds to stringer outer surface 352 as referenced in FIG. 3. Jig 1103 is configured so as to closely engage with stringer 1104. When jig 1103 is closely engaged with stringer 1104, guide holes 1165 are positioned relative to first surface 1153 and second surface 1154 of stringer 1104 such that guide holes 1165 are aligned where it is desired to form holes 357, as in FIG. 3, in first surface 1153 and second surface 1154. Holes 357 may thus be formed in first surface 1153 and second surface 1154 by a forming operation, such as, for example, drilling, or using guide holes 1165 as a guide or template for the forming operation. Jig 1103 may also include grip 1181 for manually grasping jig 1103.

The different components shown in FIGS. 4-9 may be combined with components in FIG. 3, used with components in FIG. 3, or a combination of the two. Additionally, some of the components in FIGS. 4-9 may be illustrative examples of how components shown in block form in FIG. 3 can be implemented as physical structures.

Figure 12:
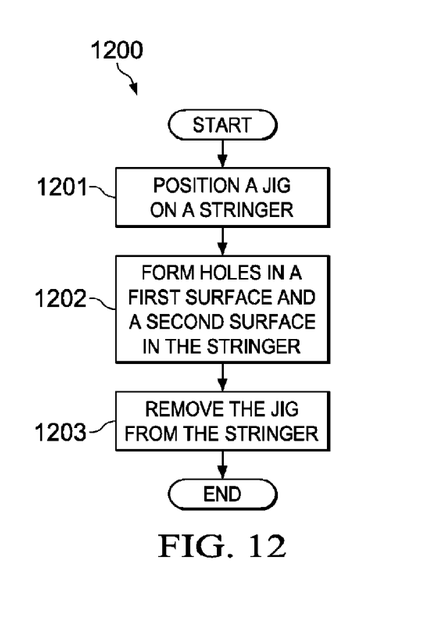
FIG. 12 is an illustration of a flowchart of a process for forming holes in a stringer in accordance with an advantageous embodiment.

With reference now to FIG. 12, an illustration of a flowchart of a process for forming holes in a stringer is depicted in accordance with an advantageous embodiment. The process is generally designated by reference number 1200 and may be a process for forming holes in a stringer using a jig. One example of this process may include forming holes with a jig as depicted in FIG. 11. The method may be implemented, for example, using jig 303 interacting with stringer 304 in FIG. 3.

Process 1200 begins by positioning jig 303 on stringer 304 (operation 1201). Jig 303 may be positioned such that jig inner surfaces 367 closely engages with outer surface 352 of stringer 304. As desired, an operator may slide jig 303 along outer surface 352 until a desired location is obtained. Guide holes 365 in first arm 361 and second arm 363 of jig 303 is positioned so as to align with a desired location for the placement of holes 357.

In a further step, holes 357 are formed in first surface 353 and second surface 354 of stringer 304 (operation 1202). Forming holes 357 may take place by a drilling operation. The drilling may include positioning a tool or drill bit through guide holes 365 so as to form holes 357. A plurality of holes 357 may be formed. In one advantageous embodiment, two holes 357 are formed in each of first surface 353 and second surface 355.

In a further step, jig 303 is removed from stringer 304. An operator may grasp grip 1081 to manually remove jig 303 (operation 1203), with the process terminating thereafter.

Figure 13:
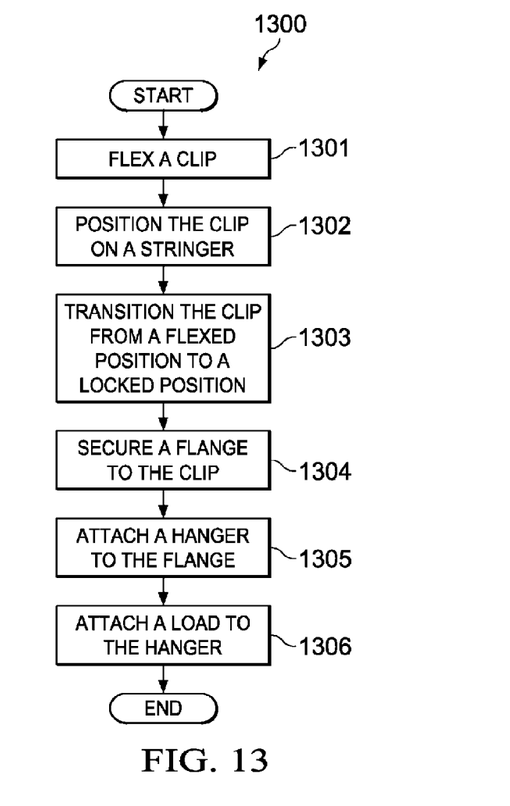
FIG. 13 is an illustration of a flowchart of a process for using a clip to connect a load to a stringer in accordance with an advantageous embodiment.

With reference now to FIG. 13, an illustration of a flowchart of a process for using a clip to support a part on a stringer is depicted in accordance with an advantageous embodiment. The process is generally designated by reference number 1300 and may be a process for supporting a load on a stringer using a clip. One example of this process may include supporting a part as depicted in FIG. 9. The method may be implemented, for example, using clip 307 interacting with stringer 304 in FIG. 3.

Process 1300 begins by flexing clip 307 (operation 1301). Flexing clip 307 transitions clip 307 from locked position 319 to flexed position 318. Flexing clip 307 may take place by manually squeezing first member 311 and second member 313 so as to induce a flexing at central portion 316. In flexed position 318, clip 307 provides clearance for inner surface 370 of clip 307 to be moved along outer surface 352 of stringer 304.

In a further step, clip 307 is positioned on stringer 304 (operation 1302). In flexed position 318, clip 307 can be easily moved to a desired position. Clip 307 is positioned such that number of pins 320 on both first member 311 and second member 313 align with holes 357.

In a further step, clip 307 is transitioned from flexed position 318 to locked position 319 (operation 1303). When the transition occurs, number of pins 320 enters holes 357. The transition from flexed position 318 to locked position 319 may occur by an operator releasing a manual squeezing force on first member 311 and second member 313 so as to allow center portion 316 of clip 307 to spring back to locked position 319. This kind of spring back transition may occur when clip 307 comprises a flexible polymer material. Alternatively, the transition to locked position 319 may occur by an operator manually moving clip 307 to that position. Inner surface 370 of clip 307 closely engages with outer surface 352 of stringer 304.

In a further step, flange 330 is secured to clip 307 (operation 1304). Flange 330 may be secured by connecting flange 330 with fastener 333 to first member 311 and second member 313. Securing flange 330 to first member 311 and second member 313 prevents first member 311 and second member 313 from moving and, therefore, secures clip 307 in locked position 319. Number of pins 320 remains in holes 357.

In a further step, hanger 340 is attached to flange 330 (operation 1305). Hanger 340 may be fastened to flange 330. Alternatively, hanger 340 may be connected to clip 307.

In a further step, load 305 is attached to hanger 340 (operation 1306) with the process terminating thereafter. Load 305 may include part 382. The close engagement of inner surface 370 and outer surface 352 allows for the efficient transfer of mechanical forces from clip 307 to stringer 304. Thus, forces developed by load 305 are transferred through clip 307 to stringer 304 and thereby to other structures connected to stringer 304.

Figure 14:
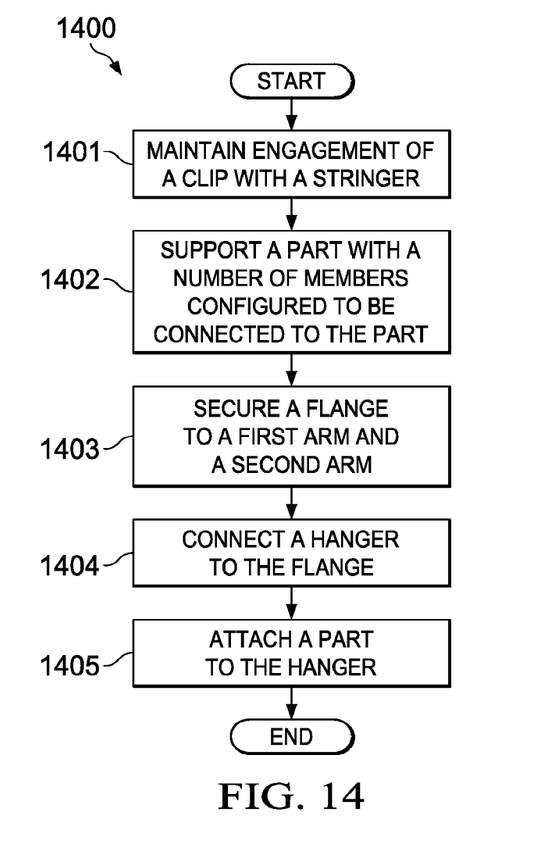
FIG. 14 is an illustration of a flowchart of a process for using a clip in accordance with an advantageous embodiment.

With reference now to FIG. 14, an illustration of a flowchart of a process for using a clip is depicted in accordance with an advantageous embodiment. The process is generally designated by reference number 1400 and may be a process for supporting a part, such as, for example, supporting a part on a stringer using a clip. The method may be implemented, for example, using clip 307 interacting with stringer 304 in FIG. 3.

Process 1400 begins by maintaining engagement of clip 307 with stringer 304 (operation 1401). In one advantageous embodiment, clip 307 may comprise a structure having inner surface 370 with a shape configured to substantially conform to outer surface 352 of stringer 304. Clip 307 may also comprise number of pins 320 which extends from inner surface 370. Number of pins 320 are configured to engage holes 357 in outer surface 352 of stringer 304 when the structure is placed over outer surface 352 of stringer 304, in addition to supporting the structure with respect to the stringer when a load is applied to the structure. Clip 307 may also comprise a number of members extending from the structure.

In a further step, part 382 is supported with the number of members, wherein the number of members is configured to be connected to the part (operation 1402). Part 382 may comprise a number of different parts used in aircraft assembly and manufacturing, such as, for example, a tube, a conduit, a wiring bundle, and the like. Other ancillary equipment, such as collars, fittings, and fasteners, may be used to support part 382.

In a further step, flange 330 is secured to first arm 312 and to second arm 314 (operation 1403). Flange 330 may be secured by attaching fasteners 333 to each of first arm 312 and second arm 314.

In a further step, hanger 340 may be attached to flange 330 (operation 1404). Hanger 340 may assist in connecting or supporting part 382.

In a further step, part 382 is attached to hanger 340 (operation 1405) with the process terminating thereafter. Part 382 may be attached using ancillary equipment, such as collars and supports. Additionally, part 382 may be supported by using multiple clips 307 positioned on more than one stringer 304. An example of part 382 supported by more than one clip 307 and hanger 340 is illustrated in the embodiment of FIG. 9. Additionally, clip 307 may support part 382 at different locations on stringer 304. In the example of a tube or conduit, part 382 may have a length that runs along a portion of stringer 304. It may be necessary to support part 382 at a stringer 304 or between stringers at more than one lateral position. Thus, multiple clips 307 may be used at more than one lateral position in order to provide support for part 382.

The placement of clip 307 may also be adjusted once part 382 is in place. For example, it may be necessary to temporarily move part 382 in order to gain temporary access to a portion of aircraft 200 that is blocked by part 382. This may be accomplished by removing part 382 from hanger 340, flange 330, and/or clip 307. It may not be necessary to remove clip 307. Optionally, clip 307 may be removed. Part 382 may be replaced as needed. Additionally, the support for part 382 can be adjusted by movement of clip 307 after part 382 has been installed. Part 382 may be disconnected from clip 307, and clip 307 may be moved to a different position on stringer 304.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, an operation, or a portion of computer usable or readable program code, which comprises one or more executable instructions for implementing the specified function or functions. Some of the blocks may be performed by human operators, machines, or other types of operators.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an advantageous embodiment of the disclosure described herein, a structure is provided that may interact with an aircraft stringer so as to support a load connected to the structure. The structure may take the form of a body or clip that has an inner surface configured to closely engage with an outer surface of the stringer. The structure may be flexed at a center portion so as to transition between a flexed position and a locked position. The structure may be positioned in the flexed position, and may be secured to the stringer in the locked position. An operator may squeeze the structure so as to transition the structure to the flexed position, and the operator may manually position the structure.

In an advantageous embodiment of the disclosure described herein, a clip includes a first member and a second member. A number of pins are disposed on the first member and the second member. The pins are configured to engage with holes positioned on a first surface and a second surface of the stringer. A flange, such as a rigid bracket, may be secured between the first member and the second member so as to secure the position of the first member and the second member. Thus, securing the flange to the clip also prevents the number of pins from being removed from the holes in the stringer, and thereby the clip is locked into position with respect to the stringer.

In another advantageous embodiment of the disclosure described herein, a jig may be used to form holes in a stringer. The jig may include a first arm and second arm that are generally formed so as to conform to the outer surface of the stringer. The jig may be placed over the stringer. Guide holes in each of the first arm and the second arm are positioned where it is desired to form the holes. The guide holes provide a means by which a tool, such as a drill, may be inserted so as to form the holes.

The description of the different advantageous embodiments has been presented for purposes of illustration and description, and is not intended to be exhaustive or limited to the embodiments in the form disclosed. Many modifications and variations will be apparent to those of ordinary skill in the art.

Although an advantageous embodiment has been described with respect to aircraft, the advantageous embodiment may be applied to supporting structures in other types of platforms. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for supporting a part, the method comprising:
   engaging a clip with a stringer via:
      connecting a first member of the clip to a second member of the clip via a center portion;
      flexing the center portion into a flexed position;
      while flexing the center portion, aligning a pin extending away from a contact section of the first member, with a hole in a first side of an outer surface of the stringer, and aligning a pin extending away from a contact section of the second member, with a hole in a second side of the outer surface of the stringer;
      engaging the pin extending away from the contact section of the first member into the hole in the first side of the outer surface of the stringer and engaging the pin extending away from the contact section of the second member into the hole in the second side of the outer surface of the stringer, via unflexing the center portion into a locked position;
   locking the clip onto the stringer via inhibiting the center portion from flexing out of the locked position, via connecting a flange to a projection from the first member and to a projection from the second member; and
   supporting the part via the flange connecting the part to the clip.

2. The method of claim 1 further comprising:
   securing the flange into a hole in the projection from the first member and into a hole in the projection from the second member.

3. The method of claim 2, wherein the flange further comprises holes for connecting the flange to the clip.

4. The method of claim 3, wherein each contact section comprises more than one pin, each pin configured to align with a respective hole in the stringer.

5. The method of claim 3 further comprising connecting a hanger to the flange.

6. The method of claim 1 further comprising holding the clip in the flexed position during positioning the clip relative to the stringer.

7. The method of claim 1 further comprising drilling at least one hole in the first side of the stringer and at least one hole in the second side of the stringer using a jig, wherein the jig comprises guide holes that correspond to the at least one hole in the first side and the at least one hole in the second side.

8. The method of claim 1, wherein the clip comprises a thermoplastic.

9. The method of claim 1, wherein the clip comprises a unitary piece.

10. A method for supporting a part on a stringer in an aircraft, the method comprising:
engaging a clip on the stringer, via;
connecting a first member of the clip to a second member of the clip via a center portion;
flexing the center portion into a flexed position;
while flexing the center portion, aligning a pin extending away from a contact section of the first member, with a hole in a first side of an outer surface of the stringer, and aligning a pin extending away from a contact section of the second member, with a hole in a second side of the outer surface of the stringer;
engaging the pin extending away from the contact section of the first member into the hole in the first side of the outer surface of the stringer and engaging the pin extending away from the contact section of the second member into the hole in the second side of the outer surface of the stringer, via unflexing the center portion into a locked position;
locking the clip onto the stringer, via connecting a flange to a projection from the first member and to a projection from the second member; and
supporting the part via the flange connecting the part to the clip.

11. The method of claim 10 further comprising the flange securing the clip in the locked position.

12. The method of claim 11, wherein the first member and the second member comprise separate thermoplastic pieces connected by the flange.

13. The method of claim 10, further comprising flexing the clip comprising moving a hole in the projection from the first member closer to a hole in the projection of the second member.

14. The method of claim 10, further comprising:
securing the flange into a hole in the projection from the first member and into a hole in the projection from the second member.

15. The method of claim 14, wherein the flange further comprises holes for connecting the flange to the clip.

16. The method of claim 15, wherein each contact section comprises more than one pin, each pin configured to align with a respective hole in the stringer.

17. The method of claim 15 further comprising connecting a hanger to the flange.

18. The method of claim 10 further comprising holding the center portion in the flexed position during positioning the clip relative to the stringer.

19. The method of claim 10 further comprising drilling at least one hole in the first side of the stringer and at least one hole in the second side of the stringer using a jig, the jig comprising guide holes corresponding to the at least one hole in the first side and the at least one hole in the second side.

20. The method of claim 10, further comprising retaining a standoff between the center portion and an outer surface of the stringer.

* * * * *